July 14, 1931.  A. S. HANSEN  1,814,918

PULSATOR

Filed Sept. 1, 1928

Inventor
A.S. Hansen
By Emil Bönnelyke
Attorney

Patented July 14, 1931

1,814,918

UNITED STATES PATENT OFFICE

ADOLF STRANGE HANSEN, OF MALMO, SWEDEN

PULSATOR

Application filed September 1, 1928, Serial No. 303,502, and in Sweden September 7, 1927.

My present invention refers to pulsators for use in connection with milking-machines and the like, and more specifically it refers to pulsators of the kind provided with two slide pistons intercontrolling each other, whereby said pistons are caused to move in the manner desired on account of the difference in two separate air pressures only, two different air spaces or groups of teat cups being alternately set by means of one piston under the influence of the different air pressures.

The main object of the invention is to improve the pulsator in constructional respect in order to simplify the structure and to obtain a better and more readily controllable function of the apparatus. This and a number of secondary objects, as will be understood from the following, are obtained by mounting the piston causing the change in air pressures in the teat cup groups within the interior of the other piston and by connecting the ends of the cylinder, within which the last mentioned piston is reciprocably mounted, with the chambers or spaces subjected to the changes in pressure, by channels provided with easily controllable valve means.

Figure 1:
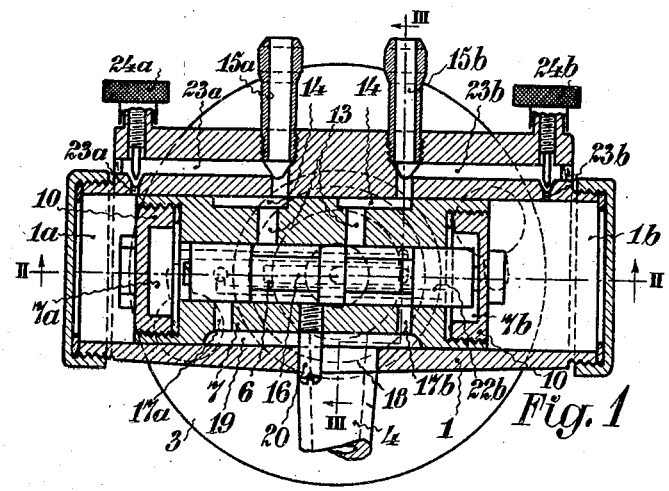
Figure 2:
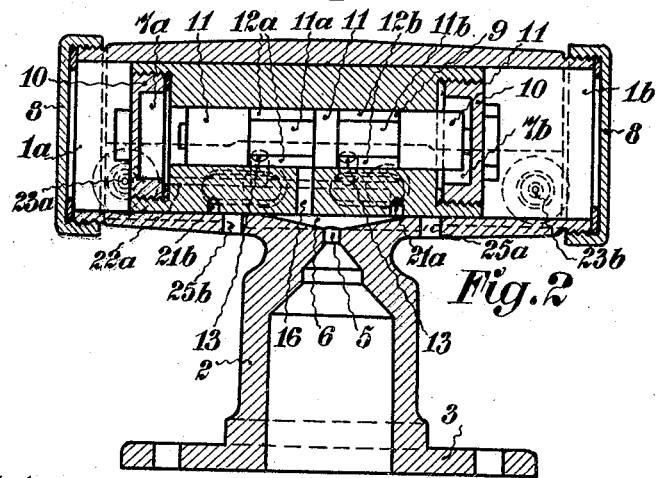
Figures 3, 4:
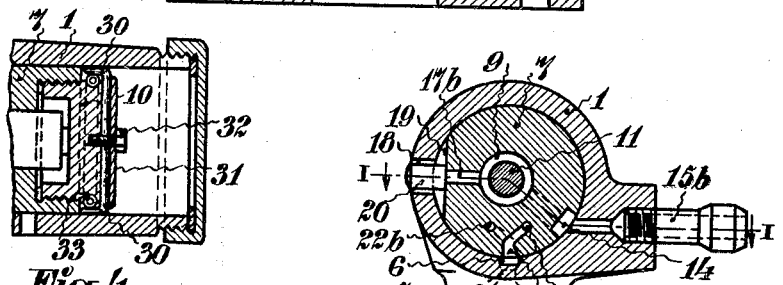

An embodiment of the invention is illustrated in the accompanying drawings, wherein Fig. 1 is a horizontal section through the apparatus substantially on the line I—I in Fig. 3. Fig. 2 is a vertical section on the line II—II in Fig. 1, and Fig. 3 is a vertical cross section on the line III—III in Fig. 1. Fig. 4 is a fragmental vertical section of a modification of the tightening means, as will be more fully described hereinafter.

In the embodiment shown in Figs. 1–3 the apparatus consists of a cylinder 1 constructed integral with a hollow base member 2 provided with a connecting flange 3 and a suction pipe 4 (Fig. 3), which latter, by means of a rubber hose or the like, is intended to be connected with the vacuum pump or with piping leading to a suitable source of vacuum. By means of a port 5 the interior of the hollow base member 2 communicates with a longitudinal groove 6 or the like in the interior of the cylinder 1, within which a piston 7 is slidably mounted so as to be reciprocated therein. This piston 7 lacks any positive mechanical connection with the other parts of the apparatus, and apart from the frictional resistance, it will thus move entirely freely within the cylinder, when acted upon by the differences in pressure, as will be described later on. At its ends the cylinder 1 is closed by covers 8 affixed by threaded connections. The piston 7 is provided with a central longitudinal bore 9 closed at both ends by means of threaded plugs 10, and within said bore a piston 11 is slidably mounted, such piston lacking any positive connection with the piston 7 and other parts of the apparatus, so that, apart from the friction, it will reciprocate entirely freely within the piston 7 under the influence of differences in pressure. At both sides of a comparatively short central section, the piston 11 is provided with reduced portions $11^a$ and $11^b$ having a smaller diameter and around which chambers $12^a$ and $12^b$ will thus be formed. These chambers, by means of radial bores 13 in the piston 7 and longitudinal grooves 14 in the outer face of the same, are in permanent connection with nipples $15^a$ and $15^b$ respectively on the cylinder 1 (Fig. 1); said nipples being connected by means of rubber hoses or the like with the teat cups. Opposite to the groove 6 the piston 7 is provided with a radial bore 16 which is in permanent communication with said groove and connects it alternately with the chambers $12^a$ and $12^b$ except at the moments, when the inner end of the bore is closed by means of the short centre section of the piston 11. Two radial bores $17^a$ and $17^b$ are provided through the piston 7 and connect the interior of the same with a longitudinal recess or groove 19 provided in the outer face of said piston and permanently connected to the atmosphere by means of a slot 18 through the cylinder 1. The bores $17^a$ and $17^b$ are alternately opened or closed by the end portions of the piston 11 and are adapted at intervals to alternately connect the chambers $12^a$ and $12^b$ with the atmosphere. The slot 18 is penetrated by a pin 20 screwed into the piston 7, and by means of said pin the reciprocal movement of said piston is limited in both directions, while at the same time the pin prevents the piston from being turned around its axis within the cylinder 1. At opposite sides of its centre portion, the piston 7 is provided at its outer surface with lateral ports 21$^a$ and 21$^b$ respectively, such ports being connected with the ends 7$^a$ and 7$^b$, respectively, of the bore 9 within piston 7, by means of channels 22$^a$ and 22$^b$ positioned within the piston body. During the reciprocal movement of piston 7, the ports 21$^a$ and 21$^b$ will periodically be brought into register with the ports 25$^a$ and 25$^b$ respectively in the cylinder 1 leading to the atmosphere (Fig. 2). The nipples 15$^a$ and 15$^b$, or the channels within the cylinder leading to the same, are connected by means of channels 23$^a$ and 23$^b$ respectively with the adjacent ends 1$^a$ and 1$^b$ respectively of the chamber within the cylinder 1, and the free area of the last mentioned channels is controllable by means of needle valves 24$^a$ and 24$^b$ respectively (Fig. 1).

The manner of operation of the apparatus is as follows:—

Assuming that the parts are in the positions shown in the drawings, the vacuum is transmitted by the pipe 4 the port 5, the groove 6 and the bore 16 to the interior of the chamber 12$^a$ and consequently to the nipple 15$^a$; the chamber 12$^b$ and the nipple 15$^b$ then being in connection with the atmosphere by means of the bore 17$^b$, the groove 19 and the slot 18. Under the influence of the vacuum also transmitted to the cylinder end 1$^a$ and the atmospheric pressure admitted to the cylinder end 1$^b$, the piston 7 has just reached its left hand end position, so that the port 21$^b$ has just passed the port 25$^b$, and the vacuum previously prevailing within the chamber 7$^b$ has fully or in part been eliminated. Simultaneously the port 21$^a$ has just come into register with the groove 6, and consequently a vacuum is created within the chamber 7$^a$, due to the influence of which the piston 11 is thrown over from the right hand end position shown in the drawing into the corresponding left hand end position. Hereby the chamber 12$^a$, however, is brought into communication with the atmosphere, and the chamber 12$^b$ is brought into communication with the vacuum channels. Under the influence of the vacuum transmitted to the cylinder end 1$^b$ and the atmospheric pressure admitted to the cylinder end 1$^a$, the piston 7 will consequently move towards its right hand end position, whereby the rapidity of this movement and, hence the frequency of pulsation may be minutely controlled within wide limits by means of the needle valves 24$^a$ and 24$^b$, as will be readily understood. When the piston 7 arrives at its right hand end position, the vacuum within the chamber 7$^a$ has more or less been eliminated by means of the port 21$^a$ which has been in register with the port 25$^a$, so that the piston 11 has been reversed into its right hand end position on account of the fact that the port 21$^b$ has come into register with the groove 6. The piston 7 will then again be driven towards its left hand end position and so forth. It will thus be understood that no dead centre can appear and that the apparatus will go into action immediately, as the vacuum is created quite irrespective of the occasional positions of the pistons within their cylinders or bores. It will also be seen that the reversal of movement will occur very rapidly, and consequently the pulsations will be very distinct and strong.

The apparatus will also operate when acted upon by a comparatively weak vacuum, since both pistons are easily movable. In pulsators provided with spring pressed valves, pistons or diaphragms, the apparatus will not be set into action before the difference in pressure between the atmosphere and the vacuum used is sufficient to overcome the spring tension. According to the present invention the apparatus comprises no parts which have a tendency to become jammed or else to get out of working order and, besides, it is very easily dismountable for the purpose of inspection. For the purpose of tightening the pistons no steps need to be taken beyond a fair fitting of the pistons in their cylinders, though tightening means may, of course, be readily provided, and it may be preferable to construct the pistons themselves in such a manner that they may easily be equipped with tightening means, if desired, for instance in the form of leather cups or the like, for obtaining a better tightening after some degree of wear. The wear will, however, be very small, as it is an easy matter to provide for an effective lubrication, and the interior of the apparatus is very well protected from dust and moisture.

A manner of replaceably mounting the leather cups on the pistons is illustrated in Fig. 4, and according thereto the ends of the piston 7, i. e. the end faces of the plugs 10, are provided with end washers 31 fastened in place by one or more screws 32, which serve, as securing means for a leather washer 30 provided with a bent edge so as to form a tightening cup of the conventional type. A peripheral slot is provided in the outer side of the projecting end of each plug 10, and a helical spring 33 is mounted in said slot for resiliently pressing the bent bent edge of the leather cup towards the inner face of the cylinder.

Of course, the invention is not limited to the structural details described above and shown in the drawing for the sake of explanation, but may be modified in many ways without departing from the scope of the invention. The main point is, that the pulsator is provided with two pistons, one positioned within the other, and one of which, at its movement, serves the purpose of alternately interconnecting two chambers with a high pressure and a low pressure inlet respectively, whereby one of said pistons is reciprocated by being subjected to the pulsations thus created and controls the movements of the second piston. The operation of the apparatus will be equally satisfactory whether the cylinders and pistons are placed with their axes in a horizontal or a vertical position, and the apparatus may be placed either directly on the milk container, which is usually the case, or in combination with the teat cups, so that it is suspended together with the latter below the udder of the cow, whereby the effectiveness of the pulsations will be increased.

What I claim and desire to secure by Letters Patent is:—

1. A pulsator for milking machines, comprising a cylinder having an elongated suction port, and also having a pair of nipples adapted to be connected to the teat cup lines; a hollow outer piston valve slidable within the cylinder and formed with two pairs of spaced lateral ports, and with a central port located between one of said pairs of lateral ports and constantly communicating with said suction port, the other pair of lateral ports being in constant communication with said nipples; and an inner piston valve slidable in the bore of, and relatively to, the outer valve and provided with a pair of spaced, annular circumferential grooves which constantly communicate with the second-named pair of lateral ports in said outer valve; both valves being mounted concentrically in said cylinder to be actuated pneumatically in opposition to each other, the inner valve distributing the air at different pressures alternately to the nipples.

2. A pulsator according to claim 1, in which the cylinder is additionally provided at opposite sides of its center with two air ports; while the outer piston valve is additionally provided with two ports which, in the end positions of that valve, communicate with the suction port in the cylinder and, during the movement of said valve toward said end positions, come into communication with said air ports; the said additional ports in the outer valve being in channel connection with the ends of the bore of said outer valve.

3. A pulsator for milking machines, comprising a cylinder having a pair of nipples for connection to the teat cup lines, and a system of ports for admitting air at different pressures; and a valve for alternately distributing the air at said pressures to the nipples, consisting of a reciprocating outer piston, and a relatively small and light inner piston reciprocating within and in opposition to the outer piston, both pistons being actuated by the pressure differences; said cylinder having ports connecting with the nipples, and said inner piston having spaced chambers constantly communicating with said nipple ports through ports in the outer piston; said outer piston also having ports for communication with the air ports of the cylinder and which are controlled by the reciprocating movements of the said inner piston.

In testimony whereof I have signed my name to this specification.

ADOLF STRANGE HANSEN.